United States Patent [19]

Fapiano

[11] Patent Number: 5,101,650
[45] Date of Patent: Apr. 7, 1992

[54] TANDEM MILL FEED FORWARD GAGE CONTROL WITH SPEED RATIO ERROR COMPENSATION

[75] Inventor: Donald J. Fapiano, Salem, Va.

[73] Assignees: Allegheny Ludlum Corporation, Pittsburgh, Pa.; Fapiano Consulting, Inc., Salem, Va.

[21] Appl. No.: 517,266

[22] Filed: May 1, 1990

[51] Int. Cl.⁵ .............................. B21B 37/00
[52] U.S. Cl. .............................. 72/8; 72/11; 72/19; 72/16; 364/472
[58] Field of Search ............ 72/8, 11, 14, 15, 16, 72/17, 19; 364/472

[56] References Cited

U.S. PATENT DOCUMENTS

| 3,566,639 | 3/1971 | Dornbusch | 72/16 |
|---|---|---|---|
| 4,240,147 | 12/1980 | Morooka et al. | 72/8 |
| 4,292,825 | 10/1981 | Morooka et al. | 72/8 |
| 4,408,470 | 10/1983 | Fromont et al. | 72/11 |
| 4,506,197 | 3/1985 | Kondo et al. | 72/8 |

FOREIGN PATENT DOCUMENTS

| 0039411 | 3/1984 | Japan | 72/8 |
|---|---|---|---|
| 0162221 | 7/1986 | Japan | 72/16 |

OTHER PUBLICATIONS

Thickness Control in Cold Rolling, D. J. Fapiano and D. E. Steeper, Iron and Steel Engineer, Nov. 1983.
New Approaches to Cold Mill Gage Control, W. D. King and R. M. Sills, AISE Yearly Proceedings, 1973, p. 187.

Primary Examiner—Lowell A. Larson
Assistant Examiner—Thomas C. Schoeffler
Attorney, Agent, or Firm—Patrick J. Viccaro

[57] ABSTRACT

A method for controlling metal strip thickness in a multi-stand rolling mill is provided which employs feed forward control to adjust the main drive armature current at the upstream mill stand when strip thickness data arrives at the downstream mill stand, establishes a control signal representing the desired speed of the first stand as a function of the second stand's measured speed, the strip thickness measurements, and the scheduled speeds of the first and second stands, develops an armature current reference modifier which is added to the current reference developed by the conventional speed regulator and thereby improves gage control by reducing the response time for upstream stand speed changes and by correcting upstream stand speed for unplanned changes in downstream stand speed.

4 Claims, 5 Drawing Sheets

TANDEM MILL FEED FORWARD GAGE CONTROL WITH SPEED RATIO ERROR COMPENSATION

BACKGROUND OF THE INVENTION

This invention relates generally to multi-stand metal rolling mills and, more particularly, to a method of improved control of strip thickness in such mills.

Modern multi-stand cold rolling mills commonly employ a form of feed-forward gage control which acts between adjacent stands of such mills. A thickness gage situated between these stands measures strip thickness and sends a strip thickness data signal, with some inherent time delay, from the thickness gage to the downstream rolling stand. Upon arrival at the downstream stand a control action is initiated, most commonly an adjustment to the upstream speed reference in proportion to the thickness change from an initial measurement, or from some nominal thickness. For example, if a strip's thickness increases by one percent from its initial thickness, then upon arrival of the thicker strip region at the downstream stand a one percent reduction of the initial upstream stand speed reference would be made. The resulting decrease in upstream stand speed would cause an increase in interstand tension which would reduce the downstream stand rolling force and, accordingly, the gage exiting the downstream stand. In another common control arrangement, tension between adjacent stands is controlled by adjustment of the roll gap of the downstream stand. There the roll gap is closed to restore tension to some reference level, so as to reduce the downstream stand exit gage by an amount more nearly proportional to the upstream stand speed change.

An objective of feed-forward control is to improve the uniformity of strip thickness out of the downstream stand. Control of the absolute strip thickness is the objective of later control action, such as feedback control based on final thickness measurements, and is not the subject of this invention.

These control strategies and operating practices are well known and have been thoroughly described in the rolling literature, for example "Thickness Control in Cold Rolling" by D. J. Fapiano and D. E. Steeper, Iron and Steel Engineer, November 1983, and "New Approaches to Cold Mill Gage Control" by W. D. King and R. M. Sills, AISE Yearly Proceedings, 1973, p. 187.

There are two principal weaknesses in prior art embodiments of the feed forward gage control strategy. First, upstream stand speed changes are delayed by the response time of the stand speed regulator. Considerable design effort by others has been directed to improvement of this response time by various forcing functions. Second, assumptions are made that the strip thickness exiting the downstream stand will be uniform if the upstream stand speed is adjusted in proportion to the changes in strip thickness entering the downstream stand. This assumption is not sufficient if the downstream stand speed changes, as a result of a change in interstand tension produced by the change in upstream stand speed. In older mills employing screw type gap controls, the tension control by gap adjustment is relatively slow and results in tension changes which produce transient load disturbances on both adjacent stands. These, in turn, produce speed changes that oppose the desired change in relationship between the speeds of the adjacent stands. The temporary tension increase produced by lowering the upstream stand speed would cause downstream stand speed to fall so that the resulting gage correction would be less than desired. While this problem might be addressed by some form of approximate compensation, the required compensation would depend on schedule dependent factors which are difficult to model, and in fact, have not been included in known feed-forward control systems.

To overcome the deficiencies of the prior methods, it is desirable to determine and apply the feed-forward corrections in a manner which accounts for the speeds of both adjacent stands, and also to improve the responsiveness of the main drive control to the feed-forward corrections.

It is, therefore, an objective of the present invention to provide an improved method of rolling metal strip.

It is a further objective to provide a method of strip thickness control which reduces strip thickness variations caused by inadequate response of main drive speed regulators and by unplanned variations in rolling mill speeds.

SUMMARY OF THE INVENTION

In accordance with the present invention a method for controlling metal thickness is provided in a rolling mill having at least two mill stands and means for adjusting the stand rolling speed. The method of the present invention controls strip thickness leaving a downstream stand by measuring strip thickness with a thickness measuring means situated between stands. The thickness measurements are stored and then retrieved after a delay equal to the strip travel time between the thickness measuring means and the downstream stand. The instantaneous desired speed of the upstream stand is calculated as a function of the actual speed of the downstream stand, the planned speeds of both stands, the strip thickness of the strip increment arriving at the downstream stand, and its thickness change from the initial strip thickness. The reference to the upstream stand current regulator is adjusted as a function of the difference between the instantaneous desired speed and the actual measured speed of the upstream stand.

DETAILED DESCRIPTION OF THE PREFERRED EMBODIMENTS

Figure 1:
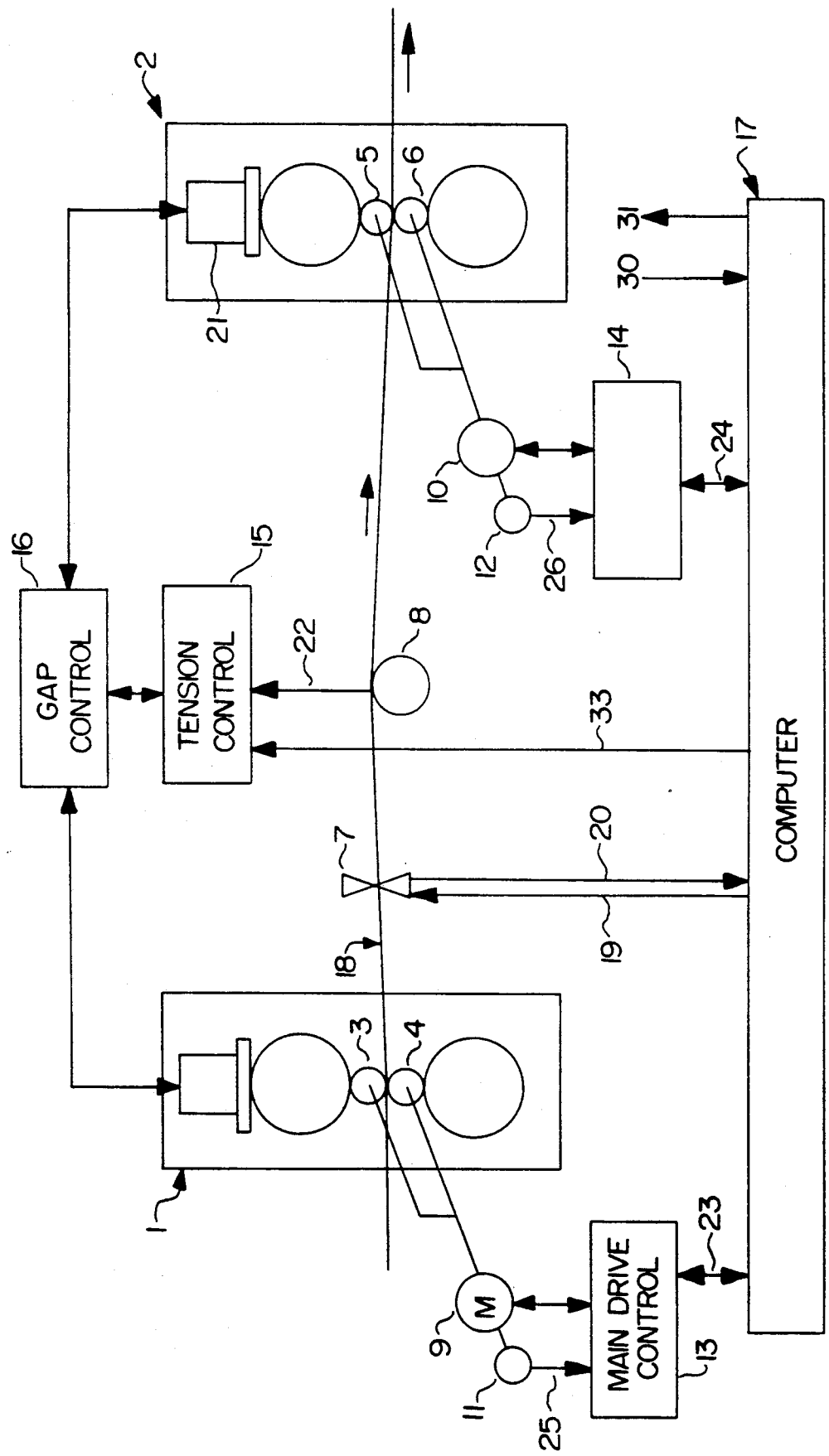
FIG. 1 is a schematic block diagram of the apparatus arrangement for the method of the present invention.

FIG. 1 shows in schematic form a typical pair of any two adjacent mill stands, such as might be employed in the implementation of the method of the present invention. It is to be understood that the depiction of FIG. 1 is simplified to show only the essential elements which are pertinent to the present invention. Further, it is understood that the depiction of FIG. 1 may be any two adjacent stands of a multistand rolling mill.

In FIG. 1, a workpiece 18 is passed through opposed workrolls 3 and 4 of a first upstream mill stand 1 and opposed workrolls 5 and 6 of a second downstream rolling mill stand 2 and passes through thickness sensing means 7 and over tension sensing means 8, both situated between the stands. Workrolls 3 and 4 are driven by motor 9 and workrolls 5 and 6 by motor 10. Speed sensors 11 and 12 are connected to motors 9 and 10, respectively, and provide speed feedbacks 25 and 26 to main drive controls 13 and 14, respectively. Drive controls 13 and 14 maintain stand 1 and stand 2 rolling speeds at reference levels 23 and 24, respectively, determined by computer 17. As the workpiece 18 passes through thickness sensing means 7, thickness measurements 20 are made and transmitted to and stored sequentially in computer 17.

Figure 2:
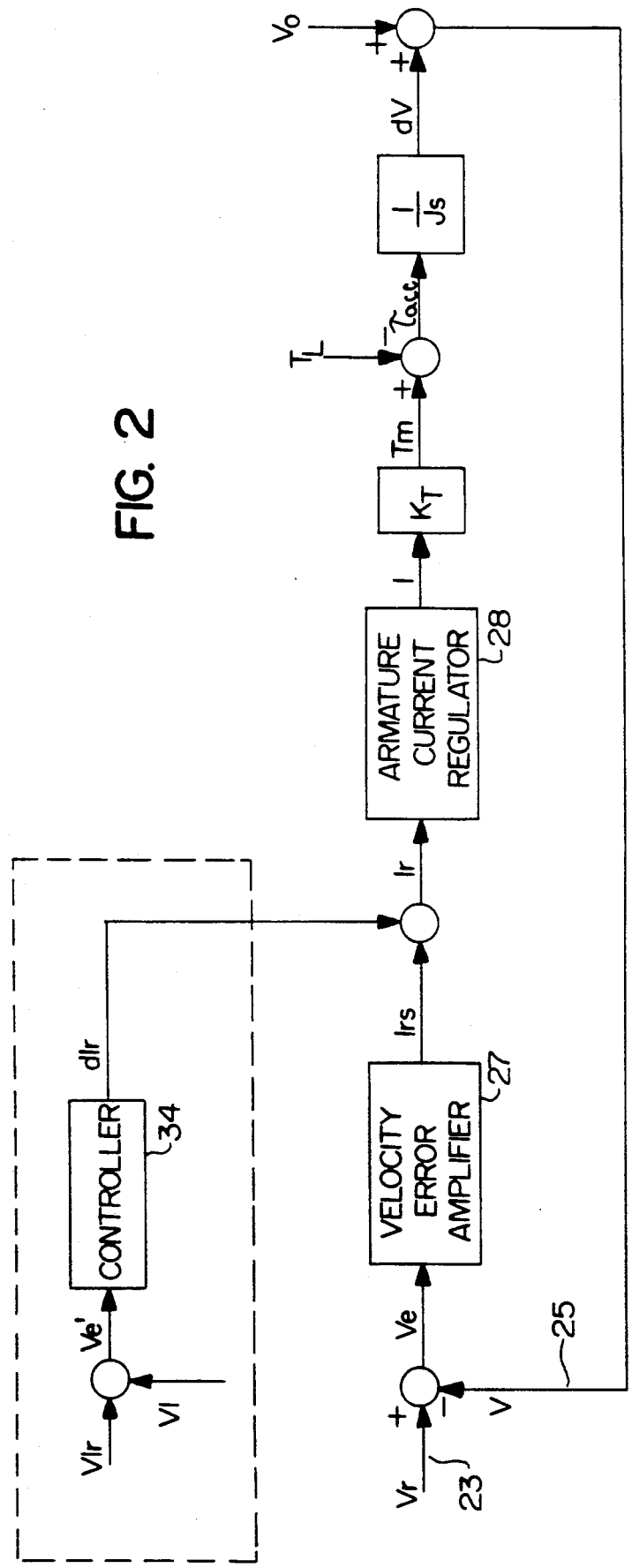
FIG. 2 is a simplified block diagram of a typical rolling mill main drive control and elements of the present invention.

FIG. 2 illustrates essential elements of the main drive control 13 in simplified block diagram form. Speed reference 23 is compared with speed feedback 25 to produce speed error, Ve, which is operated on by the speed error or velocity error amplifier 27, to produce the current regulator reference Irs. The main drive power supply and motor armature circuit are shown combined in armature current regulator 28. The current regulator controls the main drive power supply so as to produce the desired armature current, I, which results in motor torque, Tm, in accordance with well known principles of motor control. The current reference modifier, dIr, produced by the method of the present invention, is added to the current reference Irs to produce the modified current reference, Ir. Resulting armature current, I, produces motor torque Tm which combines with load torque, Tl, to produce a corresponding acceleration ($\tau cc$) and speed change dV.

Certain elements of the present invention are shown in FIG. 2 to illustrate its relation to the conventional main drive speed control. The stand 1 speed reference V1r is compared with measured stand speed V1 to produce the speed error Ve'. This is operated on by the controller 34 to provide the current reference modifier dIr which is added to the speed regulator current reference Irs to produce the modified current reference Ir.

Several elements which are not part of the present invention have been included in FIG. 1 to assist in complete understanding. It is useful to understand that the gap between opposed workrolls 5 and 6 of stand 2 is and must be adjustable. In older mills the roll gap is adjusted by screw 21 under the control of gap control 16. Alternatively, the gap may be adjusted by hydraulic cylinders as in many newer rolling mills. Tension control 15 receives a strip tension signal 22 from tension sensing means 8, compares it to the tension reference signal 33, then directs gap control 16 to adjust screw 21 so as to reduce the difference between signals 22 and 33. The action of these tension and gap control elements completes the gage changes initiated by the method of the present invention.

Reference values to the many control equipments required to operate a multi-stand rolling mill are typically generated by a set-up computer 17, such as the Digital Equipment Corporation VAX-11-780 computer. The desired stand velocities 23 and 24 and the desired strip thickness 19, which are relevant to the present invention, are among information produced by computer 17. Other inputs not pertinent to the present invention are shown as carried over bus 30 and would include, as well known in the art, such elements as rolling schedule data, operator inputs, etc. Other outputs are shown as carried over bus 31.

In the present invention as well as in prior art, control action associated with the thickness in a particular increment of strip is delayed until that element arrives at stand 2. In the method of the present invention, the speed of stand 2 is combined with the thickness change to generate a stand 1 speed reference signal V1r in accordance with the following relations:

$$V1r = V2 * (V1ro - (dH2/H2) * V1ro) / V2ro$$

where:
V1r = stand 1 speed reference
H2 = stand 2 entry strip thickness
H2o = initial value of H2
dH2 = H2 − H2o = change in strip thickness entering stand 2
V2 = stand 2 speed
V1ro = stand 1 scheduled speed reference
V2ro = stand 2 scheduled speed reference The method of the present invention differs from prior art not only in the manner in which the speed reference V1r is developed, but also in its use to develop the current reference modifier, dIr. In the present invention, V1r is compared with the measured stand 1 speed V1 to produce a speed error Ve'. Ve' is operated on by a controller to develop the current reference modifier, dIr. In a preferred embodiment, that controller utilizes proportional and derivative functions of Ve' to produce the current reference modifier, dIr. The relationship is:

$$dIr = (V1r - V1) * K * (1 + Td*s) / (1 + Tl*s)$$

where:
K = proportional gain constant
Td = derivative or lead time constant
Tl = lag time constant
s = the operator d/dt The current reference modifier, dIr, is added to the current reference, Irs, generated by the speed error amplifier 27, to produce the total current reference Ir. Simulation and field experience with typical drives suggests that good results may be obtained with the following settings:

$Td$ = .02–.03 seconds
$Tl$ = .1 * $Td$
$K$ = 3–6

The method of the present invention can be applied in parallel with the prior art method. This would be useful in eliminating cumulative errors in the speed regulator. When so used, the present invention would act to produce those components of armature current which are required to correct for the speed regulator's slow response, as well as to correct stand 1 speed so as to maintain its proper relation to stand 2 speed.

While the control methods and associated signals have been described as continuous, feed-forward strategies of this type are most typically based on sampled deviations from an initial thickness. The translation from continuous signal form to sampled data form is well known in control design and will not be reviewed here, although one factor of interest in the sampled data embodiment is of interest. Particularly, in the sampled data form, the computations and transmission of new control references associated with each successive thickness change occur at a chosen sampling frequency. It is known in the design of closed loop regulating systems that sampling frequency within a control loop must be high enough with respect to the control loop response to avoid excessive phase shift and possible instability. In the method of the present invention, however, the main drive current control loop stability is not affected by the sampling frequency of the feed-forward control. For this reason, sampling frequency need be high enough only to satisfy the gage performance requirements. For example, tests indicated that good results in the sampled data form are obtained with thickness samples and current reference modifier calculations at 0.25 second intervals, although intervals of about 0.1 second were required to fully match continuous system results.

Figure 3:
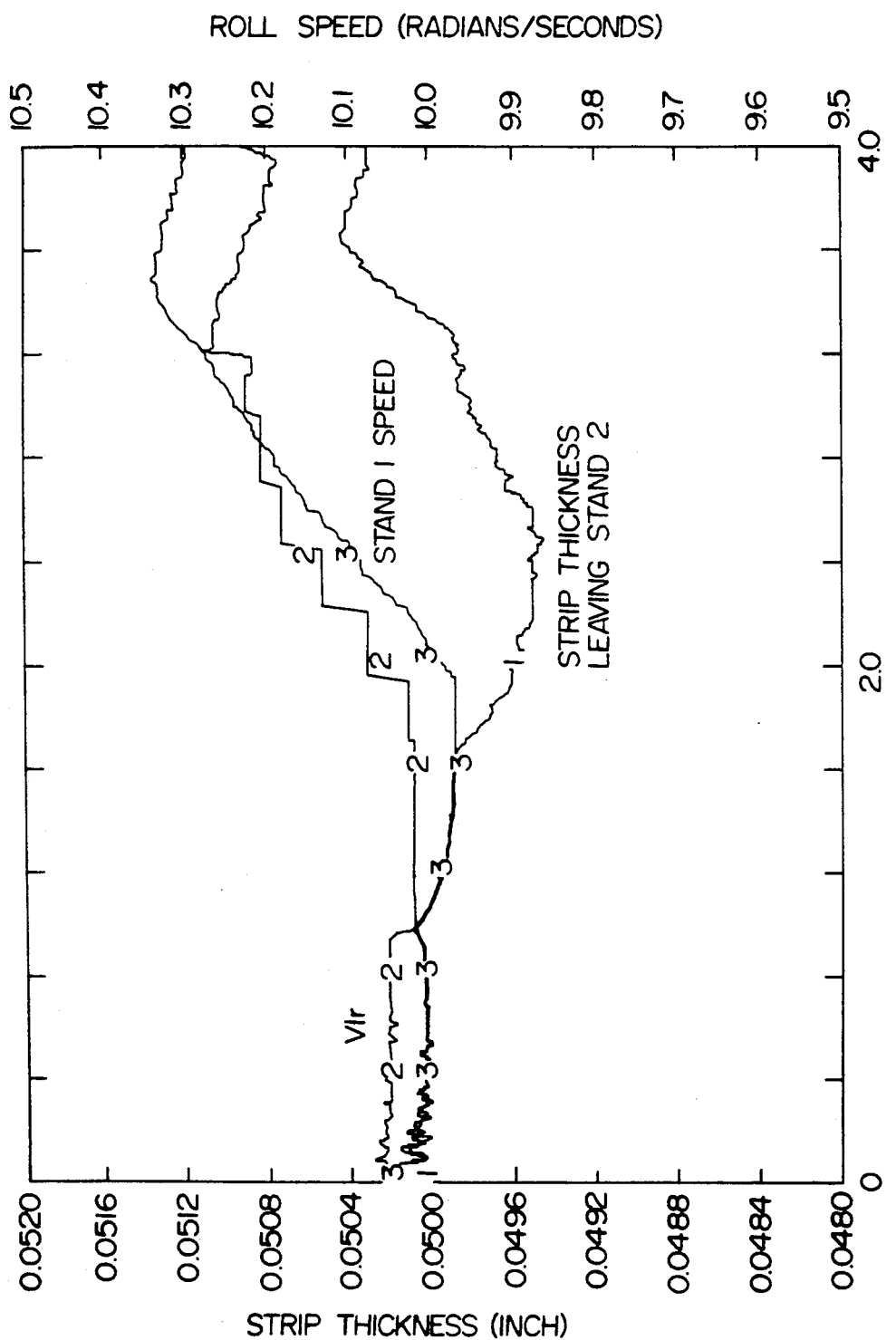
FIG. 3 is a computer simulation of prior art gage control performance.

FIG. 3 illustrates a computer simulation of feed-forward gage control employing a prior art method to correct incoming strip thickness variations. A typical sequence of incoming thickness variations to stand 1 was chosen arbitrarily to illustrate the performance differences. Speed reference changes proportional to the gage changes entering stand 2 are applied to the stand 1 speed controller. Thickness measurements, i.e., gages, are sampled four times per second in this example. Trace 1 indicates thickness leaving stand 2. Trace 2 indicates V1r, the correct speed for stand 1 considering the incoming thickness changes and the speed of stand 2. Trace 3 indicates the actual speed of stand 1, which is seen to diverge significantly from the desired course indicated by trace 2. Thickness leaving stand 2 varied about 0.001 inch over the sample length.

Figure 4:
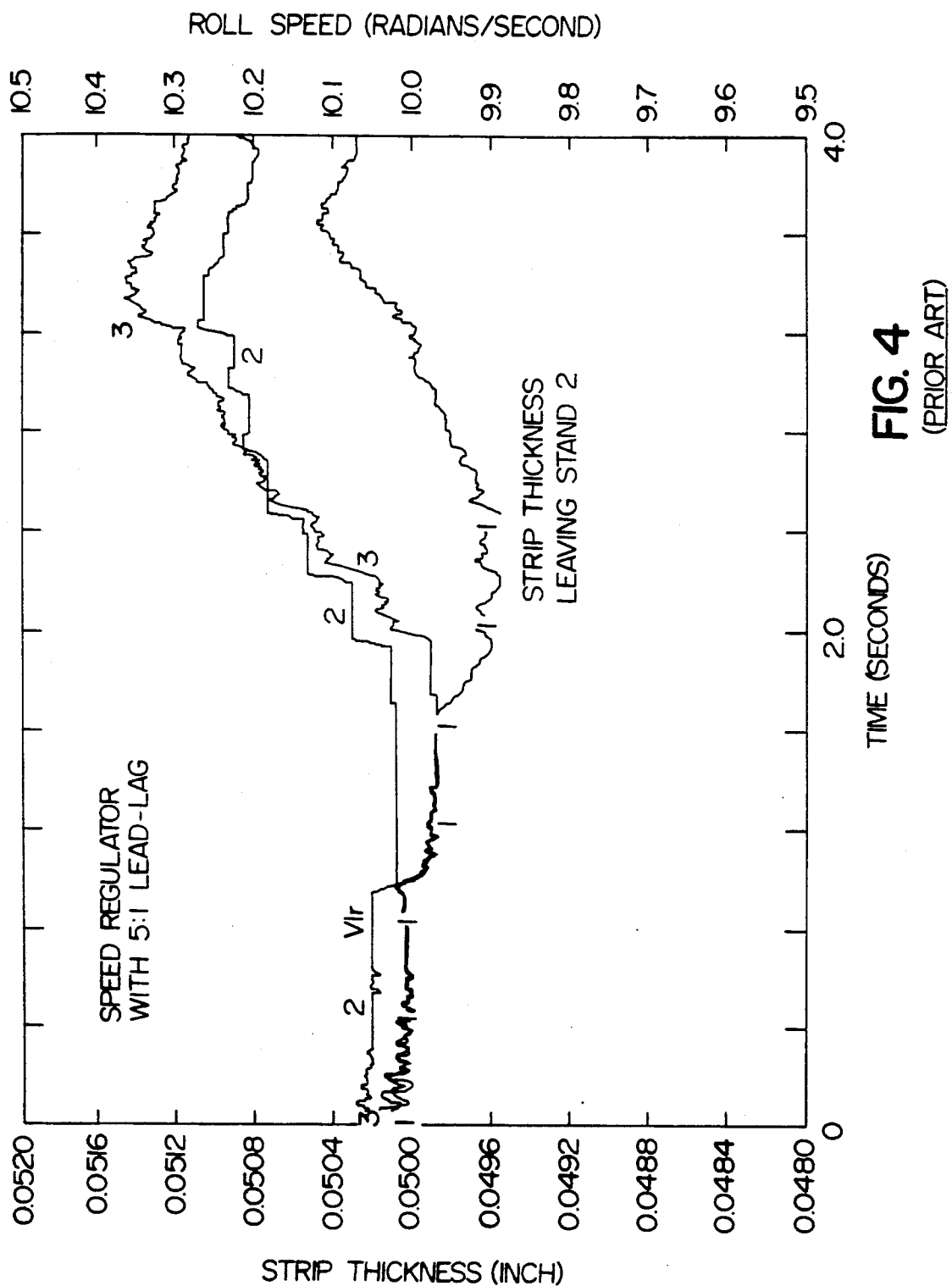
FIG. 4 is a computer simulation of gage control performance using an improved prior art method.

FIG. 4 illustrates a computer simulation of an improved prior art method of feed-forward gage control employing compensation of the main drive dynamic response, as was suggested in the previously cited Fapiano et al article "Thickness Control in Cold Rolling". The responsiveness of stand 1 speed (trace 3) is clearly improved, but there is no significant reduction in thickness variation (trace 1) because the change in stand 2 speed has not been considered in generating the reference to the speed regulator.

Figure 5:
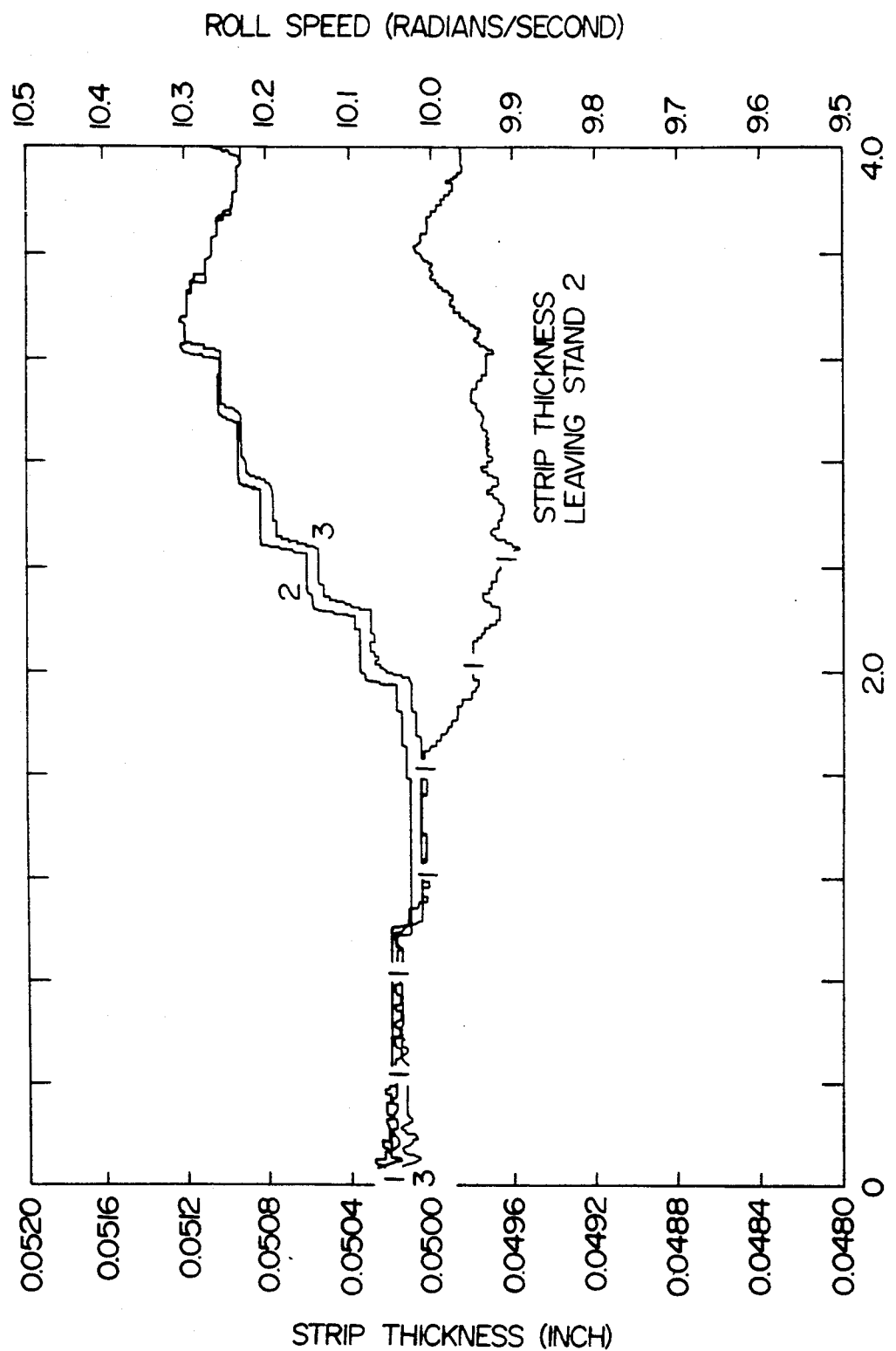
FIG. 5 is a computer simulation of gage control performance using the method of the present invention.

FIG. 5 illustrates the results of a computer simulation which repeats the conditions of FIG. 3 and FIG. 4 but employs the method of the present invention. Stand 1 speed follows the desired course (trace 2) more accurately and thickness variations leaving stand 2 are reduced about 50% compared with the prior art methods. The improvement results from the consideration of stand 2 speed changes, which are due largely to the tension-induced load changes, and, to a lesser extent, from the additional response improvement achieved by supplementing the speed regulator current reference, Irs, with the current reference modifier dIr, to achieve the desired speed at stand 1.

The present invention is thus seen to eliminate the principal problem with previous methods of feed forward gage control, and in a manner which can be readily applied to both new and existing rolling mill gage control systems.

While there has been shown and described what is at present considered to be the preferred embodiment of the present invention, modifications will readily occur to those skilled in the art. For example, the proportional and derivative functions of the controller could be supplemented with an integral component to further compensate for poor response in the speed regulator. Although such compensation is not essential, it may also require means for preventing long term drift in the integrator. Furthermore, while thickness deviations have been described as differences from an initial measured thickness, likewise, deviations could also be defined with respect to a planned or nominal downstream stand entry thickness. It is not desired, therefore, that the invention be limited to the specific arrangement shown and described and it is intended to cover, in the appended claims, all such modifications as fall within the true spirit and scope of the invention.

I claim:

1. A method for controlling metal thickness in a metal rolling mill having at least two rolling stands, each roll stand having at least one pair of opposed workrolls for reducing the thickness of a metal workpiece passed therebetween, thickness sensing means for sensing strip thickness between adjacent stands, means for sensing the rolling speed of each stand, and main drive control means for controlling the main drive motor speed and armature current, the method comprising:

(a) measuring strip thickness in successive increments of strip length passing between the first upstream stand and the second downstream stand;
   (b) as each successive increment of strip arrives at the second stand, establishing a first control signal equal to the product of the second stand speed, the scheduled ratio of first and second stand speeds, and the ratio of initial strip thickness to the thickness of each successive increment of strip;
   (c) as each successive increment of strip arrives at the second stand, establishing a second control signal proportional to the difference between the measured speed of the first stand and said first control signal; and
   (d) changing the first stand speed as a function of the second control signal.

2. The method in accordance with claim 1 wherein said first control signal is established in accordance with the relationship, $$V1r = V2 * (V1ro - (dH2 / H2) * V1ro) / V2ro$$

where:
   $V1r$ = stand 1 speed reference
   $H2$ = stand 2 entry strip thickness
   $H2O$ = initial value of H2
   $dH2 = H2 - H2O$ = change in strip thickness entering stand 2
   $V2$ = stand 2 speed
   $V1ro$ = stand 1 scheduled speed reference
   $V2ro$ = stand 2 scheduled speed reference.

3. The method in accordance with claim 1 wherein the second control signal is established in accordance with the relationship, $$dIr = (V1r - V1) * K * (1 + TD*s) / (1 + Tl*s)$$

where:
   $K$ = proportional gain constant
   $Td$ = derivative or lead time constant
   $Tl$ = lag time constant
   $s$ = operator d/dt
   $dIr$ = current reference modifier
   $V1r$ = stand 1 speed reference
   $V1$ = stand 1 speed.

4. A method for controlling metal thickness in a metal rolling mill having at least two rolling stands, each with at least one pair of opposed workrolls for reducing the thickness of a metal workpiece passed therebetween, thickness sensing means for sensing strip thickness between adjacent stands, means for sensing the rolling speed of each stand, and main drive speed control means for controlling the main drive motor speed by controlling main drive armature current, the method comprising:

(a) measuring strip thickness in successive increments of strip length passing between a first upstream stand and a second downstream stand;

(b) as each successive increment of strip arrives at the second stand, establishing a first control signal, V1r, as a function of the second stand speed, the speed references of the first and second stands, and the strip thickness measurements in accordance with the relationship, $$V1r = V2 * (V1ro - (dH2/H2) * V1ro) / V2ro$$

where:
V1r = stand 1 speed reference
H2 = stand 2 entry strip thickness
H2O = initial value of H2
dH2 = H2 − H2O = change in strip thickness entering stand 2
V2 = stand 2 speed
V1ro = stand 1 scheduled speed reference
V2ro = stand 2 scheduled speed reference (c) as each successive increment of strip arrives at the second stand, establishing a second control signal proportional to the difference between the measured speed of the first stand and said first control signal;

(d) establishing a current reference modifier, dIr, as a function of said second control signal in accordance with the relationship, $$dIr = (V1r - V1) * K * (1 + Td*s) / (1 + Tl*s)$$

where:
K = proportional gain constant
V1 = stand 1 speed
Td = derivative or lead time constant
Tl = lag time constant
s = operator d/dt
Ir = current reference modifier (e) adding said current reference modifier to the current reference produced by the main drive speed control means.

* * * * *